INVENTOR.
Stuart P. Jackson
BY
Anthony D. Pennano

United States Patent Office 3,422,342
Patented Jan. 14, 1969

3,422,342
INVERTER CIRCUIT HAVING CONSTANT CURRENT AND VARIABLE INDUCTANCE
Stuart P. Jackson, Columbus, Ohio, assignor to The Solidstate Controls, Inc., a corporation of Ohio
Filed Aug. 16, 1965, Ser. No. 479,810
U.S. Cl. 321—45      6 Claims
Int. Cl. H02m 7/44, 7/60

ABSTRACT OF THE DISCLOSURE

This invention relates to a new and improved inverter circuit wherein the inductance is made non-linear to vary as the square of the resistance. Particularly with large inductance at low values of load current and small inductance at high current values, the maximum current varies less with load changes.

---

Standby power sources in the form of batteries or engine driven generators or alternators are frequently used in systems having loads which must be energized during a failure of commercial power. If these loads contain A-C motors, instruments, fluorescent lights or control components designed for A-C operation, an inverter must be employed within the standby source. Two types of standby systems may be defined on the basis of the desired transfer characteristics. They are: (1) between failure of the primary power source and substitution of the secondary source, a brief time interval may exist (for switching, starting an engine or gas turbine, etc.), and (2) no cessation of load power may be tolerated during power transfer and no major waveform transient is tolerable.

The first system may employ static inverters because of low maintenance and high efficiency even in the face of higher first cost. The second system is more satisfactorily handled by continuous operation of the static inverter because of the high efficiency or because of the extremely fast switching of solid state devices.

Both batteries and engine driven generators or engine driven alternators are utilized as secondary sources. For instantaneous switching of power sources a battery must be employed even if an engine driven alternator is utilized as secondary source. The battery serves to provide energy to the system while the engine is being started and brought up to operating speed.

Phase changing becomes quite simple utilizing the static inverter. As an example, the common problem of a single phase load to be operated from a three phase source. In this instance, by converting the three phase power to direct voltage and inverting back to single phase output, balanced three phase loading is assured on the incoming lines in spite of single phase load variations. Also, phase changing may be combined with instantaneous switching. This may be employed if two three phase inputs, one from commercial power, and one from an engine driven three phase alternator, are used. Other combinations include frequency and voltage stabilization as well as phase changing and instantaneous switching.

Inverters may be employed to stabilize line voltage sources which have wide ampltiude fluctuations. The basic device employed to regulate the static inverter output is the ferroresonant regulator. It will accept a wide range of input voltage amplitude and provide an output held constant within a few percent. The use of an inverter for line amplitude stabilization in itself offers no advantage over the direct use of a ferroresonant regulator. It becomes a necessity if coupled with amplitude variation, frequency variation, phase changing, or, if the line to be stabilized is a direct source.

Static inverters may have a frequency stability of almost any accuracy desired. The typical 60 c.p.s. sytsem maintains frequency within ½ c.p.s. Addition of an oscillator standard such as a tuned fork reduces variation to 0.01%. Installations of a stable high frequency crystal standard with a digital dividing system can improve accuracy to four decimal places or so. Increased cost follows the increased accuracy.

A highly efficient direct current transformation method results from utilization of an inverter. A direct source is inverted to a square wave, transformed by means of a transformer and converted back to direct current. This application is most important if a direct source of one voltage is available, while at the same time a significant portion of the load is at a level widely different from the source. A typical application is in the use of logic elements operating with 12 and 24 direct volt input from a 130 direct volt system.

The present invention is an improved construction and arrangement of components. Particularly, it has been found that if the inductance is made non-linear to vary as the square of the resistance, i.e., large inductance at low values of load current and small inductance at high current values, maximum current varies less with load changes.

In this way the inductor size is smaller, consequently less in volume and cost. Starting the inverter under various load conditions is made easier due to reduced transients; less variation with load changes provides better utilization of the SCR's; less variation in source current allows better coordination of the protective system with the SCR's; also less variation in source current allows the use of an input filter of a smaller size and cost. The minimum change in energy stored in the commutating capacitor and commutating inductors due to load changes results in less utilization of the clamp system, thereby reducing system transients which may result in malfunctioning; and minimum change in energy stored in the commutating capacitor and commutating inductors due to load changes results in a smaller time delay in response, thereby reducing the possibility of a malfunction due to insufficient turn-off time.

Accordingly, the principal object of the invention is to provide a static inverter circuit having an inductive element variable with changes in the load resistance.

Another object of the present invention is to provide an inverter circuit wherein the inductor is smaller, less expensive, has reduced transients, provides better utilization of the SCR's, and better coordination of the SCR.

A further object of the present invention is to provide an inverter circuit utilizing an input filter that is smaller and less expensive.

Still another object of the present invention is to provide an inverter circuit resulting in less utilization of a clamp system thereby reducing transients, and a smaller time delay in response.

Other objects and features of the invention will become apparent from the following detailed description when taken in conjunction with the drawings in which.

Figure 1:
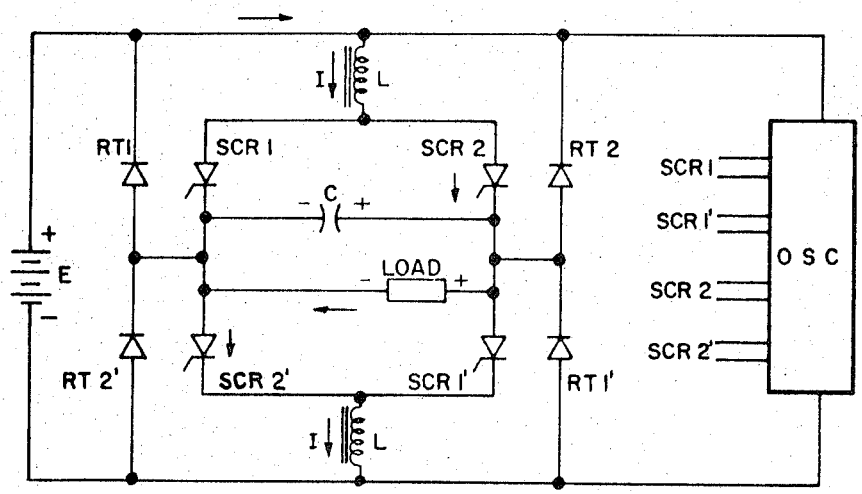
FIGURE 1 is a schematic diagram of a bridge and center tap inverter circuit illustrated for purposes of understanding the present invention.
Figure 1A:
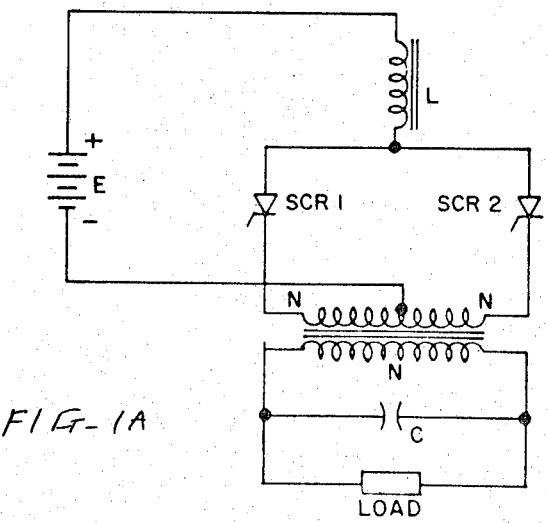
FIGURE 1a is a schematic showing another embodiment of the invention.

With reference to the bridge inverter circuit of FIGURE 1, a general analysis may be given. In the analysis certain waveform approximation are marde and the assumption of a resistive load.

Figure 2:
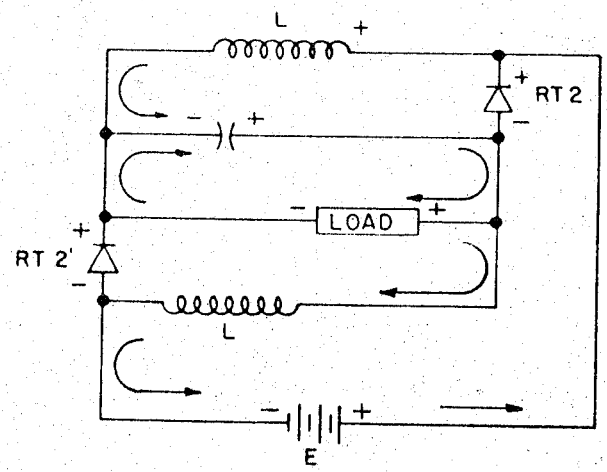
FIGURE 2 is an equivalent circuit to that of FIGURE 1 during turn-off time.

At time equal zero minus, SCR's 2 and 2' are conducting. Currents and voltages are as shown in FIGURE 1. At time equal zero, the gate voltage on SCR's 1 and 1' becomes positive turning them on. The capacitor voltage is applied across SCR's 2 and 2' in a direction to turn them off. It is important that the voltage across these SCR's have this polarity a sufficient length of time to insure that they turn off completely. FIGURE 2 gives the equivalent circuit for the interval of time from time equal zero to the time when the voltage across the capacitor equals zero ("turn off time").

Diodes RT2 and RT2' are reverse biased because the capacitor voltage, for time greater than zero, is less than the supply voltage, E. An assumption of linear voltage decay across the load resistance is made in order to derive the energy transformed to heat by the load. This interval is sufficiently short to make the error due to this assumption small.

A linear change of supply current is also assumed during this interval of time. Since this fact is used to derive the average supply current flow during turn off time, the resulting error is also small.

In the equations set forth hereinafter, the symbol representations are:

C is the capacitance, E is the direct voltage, F is for frequency, $I$ is for direct current (FIG. 4) $I_0$ is for peak current during switching (FIG. 4), $I_1$ is for minimum current during switching (FIG. 4), $i_0$ is the normalized peak current defined by Equation 7, $i_1$ is the normalized minimum current defined by Equation 14, L is for inductance, R is the load resistance, $t$ for time, $t_0$ for time at which $I_0$ occurs, $t_1$ for time at which $I_1$ occurs, $t_s$ the time to reach peak supply current on energizing inverter with no stored energy, E for energy, $E_{0-}$ for energy immediately before switching is initiated (FIGURE 4), $E_d$ for energy dissipated in the load resistance over the time interval $t_0$, $E_{d1}$ for energy dissipated in the load resistance over the time interval $t_1-t_0$, $E_s$ for energy supplied by the source over the time interval $t_1-t_0$, $E_{t0}$ for energy stored in L and C at time, $t_0$, $E_{t1}$ for energy stored in L and C at time $t_1$.

At time equal zero minus, steady state conditions exist. Supply current equals 1 and capacitor voltage equals E. The total energy at this point is expressed by $$E_{o-}=2\left(\frac{LI^2}{2}\right)+\frac{CE^2}{2}=LI^2+\frac{CE^2}{2} \quad (1)$$

A time, $t_0$, is now defined as that time when the capacitor voltage reaches zero. At this point, the supply current may be greater than 1 since the energy stored in the capacitor (less than dissipated in the load during the short interval $t_0$) is now stored in the inductors. The supply current at $t$, $t_0$ is defined as $I_0$.

Total energy at $t_0$ is $$E_{t_0}=2\left(\frac{LI_0^2}{2}\right)=LI_0^2 \quad (2)$$

Over the interval $t_0$ the energy supplied by the source $E_s$, and that dissipated in the load, $E_d$, are $$E_s=\left(\frac{I+I_0}{2}\right)t_0 \quad (3)$$

and $$E_d=\frac{E}{2}\frac{E}{R}t_0\frac{E^2}{2R}t_0 \quad (4)$$

Now by balancing the energy books over the interval $t_0$ we have $$E_0=E_s-E_d+E_{t_0} \quad (5)$$

Combining Equations 1, 2, 3, 4, and 5, $$LI^2+\frac{CE^2}{2}=\frac{E}{2}(I+I_0)t_0-\frac{E^2}{2R}t_0+LI_0^2 \quad (6)$$

Equation 6 may be simplified by expanding, noting that $E=IR$ and defining the normalized current $$i_0=\frac{I_0}{I} \quad (7)$$

The result is $$t_0=\frac{RC}{i_0}-\frac{2L}{R}\left[i_0-\frac{1}{i_0}\right] \quad (8)$$

Figure 3:
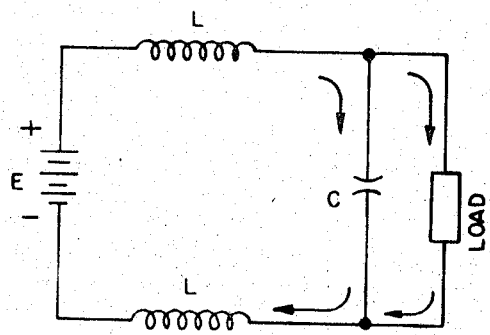
FIGURE 3 is an equivalent circuit to that of FIGURE 1 during turn-on time.

As current continues to flow, the capacitor voltage reverses polarity. At this point, the SCR's 2 and 2' are in the non-conducting state, while 1 and 1' are in a conducting state. Energy stored in the inductors, L, is partially transferred to C. The point in time at which the capacitor voltage reaches the supply voltage, E, is designated $t_1$. Any further increase in capacitor voltage will be restricted by the clamp circuit composed of the bridge rectifiers RT1, 1', 2, 2' and the source, E. The source current at time equal $t_1$, is designated $I_1$. FIGURE 3 shows the equivalent circuit for the time interval $t_1-t_0$.

Again, assuming linear capacitor voltage with time, an energy equation may be written, $$E_{t_0}=E_{t_1}+E_{s_1}-E_{d_1} \quad (9)$$

where, $$E_{t_1}=LI_1^2+\frac{CE^2}{2}=\text{circuit energy at time } t_1 \quad (10)$$

$$E_{s_1}=E\left(\frac{I+I_1}{2}\right)(t_1-t_0)-\text{energy supplied by the source} \quad (11)$$

$$E_{d_1}\frac{E}{2}\frac{E}{R}(t_1-t_0)=\frac{E^2}{2R}(t_1-t_0)$$

—energy dissipated by the load (12)

Combining Equations 6, 9, 10, 11, and 12, yields $$\frac{E}{2}(I+I_0)t_0-\frac{E^2}{2R}t_0+LI_0^2=LI_1^2+\frac{CE^2}{2}$$
$$+\frac{E}{2}(I+I_1)(t_1-t_0)-\frac{E^2}{2R}(t_1-t_0) \quad (13)$$

Equation #13 may be simplified as before by defining the normalized current $$i_1=\frac{I_1}{I} \quad (14)$$

The resulting equation is $$t_1=\left[1+\frac{i_0}{i_1}\right]t_0+\frac{2L}{Ri_1}(i_0^2-i_1^2)-\frac{RC}{i_1} \quad (15)$$

Combining Equations 8 and 15, we gain an expression for $t_1$, $$t_1=\frac{RC}{i_0}-\frac{2L}{R}\left[i_1+i_0-\frac{1}{i_1}-\frac{1}{i_0}\right] \quad (16)$$

or $$t_1=t_0+\frac{2L}{R}\left[\frac{1}{i_1}-i_1\right] \quad (17)$$

From Equation 17, we see that $i_1$ must be less than 1 for finite time interval $t_1-t_0$. Practically, this condition seems assured since there must be some energy dissipated during the transfer of energy from capacitor to inductors and back to capacitors. While the energy dissipation term in the equations allow the possibility of a zero value for an open circuit load, this is a bit of fiction since there is resistance in the leads, inductors and capacitor. The mathematical model breakdown at this point, unless we restrict the upper value at R at that value which just accounts for other circuit losses. Generally, this model fault is not important, since magnetic components or fixed loads are almost always connected across the inverter output. In either case, load current cannot go to zero and, thus, the load resistance cannot go to the open circuit value. The assumption is made, however, that the minimum dissipation attributable to the largest load resistance achievable is large compared to other circuit losses.

Figure 4:
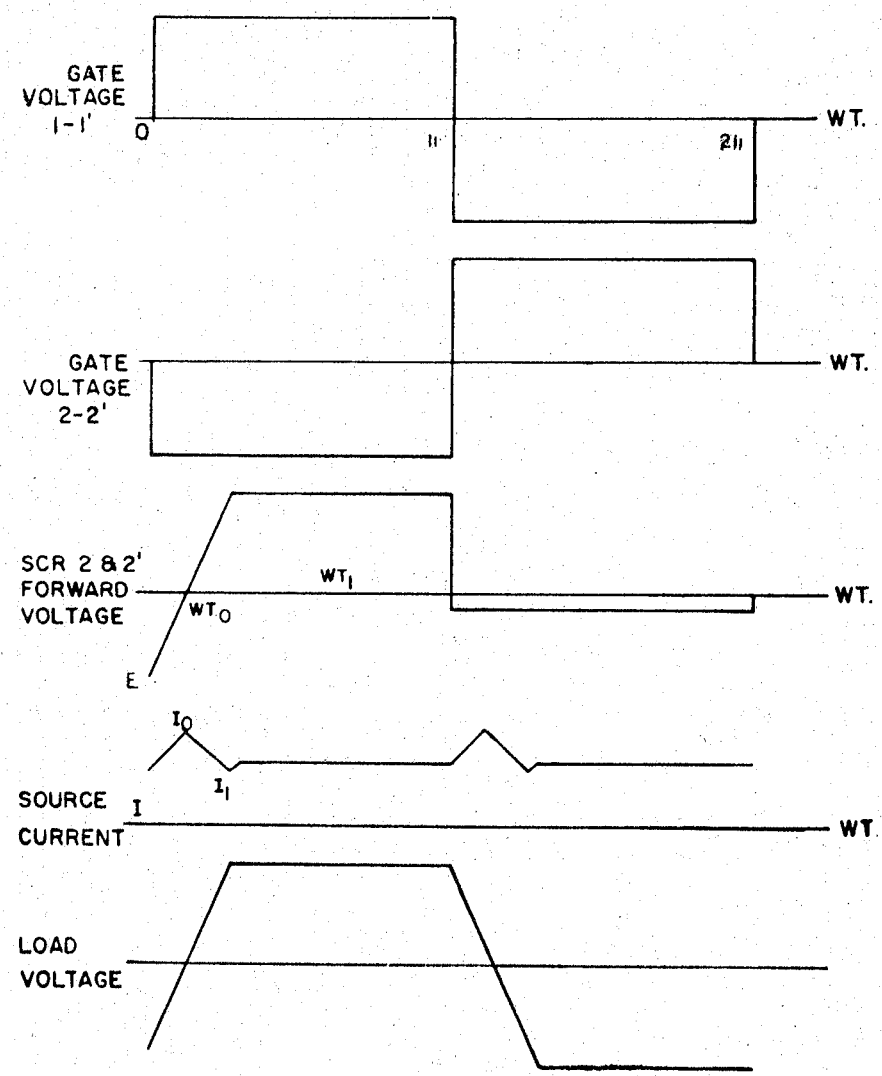
FIGURE 4 is a series of waveforms utilized for understanding the operation of the circuit of FIGURE 1.

Waveforms of the circuit operation are shown in FIGURE 4. It should be again noted that this discussion considers only steady state operation.

On first energizing the inverter, no energy is stored in the system components. Thus, the first few cycles may differ from those in steady state operation.

A simple approach to starting the inverter is to consider it as an LC series circuit. The time, $t_s$, at which the peak current is reached for such a circuit is one quarter cycle or $$t_s = \frac{1}{4f} = \frac{\pi}{2W} = \frac{\pi}{2}\sqrt{2LC} \quad (18)$$

At this time, the capacitor voltage is equal to the source voltage. This condition is similar to that which occurs at $t_1$, except that the peak current is defined by the resistance as well as L and C. In any event, the current is at a sufficiently high value to insure ample energy storage in the inductors. The clamp circuit will maintain this voltage by allowing the "surplus" current to flow back to the source.

The start up conditions described approximate those that exist in the interval $t_1 - t_0$. Thus this condition yields a relationship between L and C. If $$t_s = t_1 - t_0 \quad (19)$$

then from Equations 17, 18, and 19

$$\frac{\pi}{2}\sqrt{2LC} = \frac{2L}{R}\left[\frac{1}{i_1} - i_1\right]$$

or $$RC = \frac{4}{\pi^2}\left[\frac{1}{i_1} - i_1\right]\frac{2L}{R} \quad (20)$$

Combining Equations 8 and 20, we may express $t_0$ in terms of the inductance and resistance, or $$t_0 = \frac{2L}{R}\left\{\frac{4}{\pi^2 i_0}\left[\frac{1}{i_1} - i_1\right] - \left[i_0 - \frac{1}{i_0}\right]\right\} \quad (21)$$

In like manner, $$t_1 = \frac{2L}{R}\left\{\frac{4}{\pi^2 i_o}\left[\frac{1}{i_1} - i_1\right]^2 - \left[i_0 - \frac{1}{i_0}\right] + \left[\frac{1}{i_1} - i_1\right]\right\} \quad (22)$$

Equations 20 and 21 provide the necessary information for design. The turn off time, $t_0$, and the peak current, $I_0$, are defined on selection of the silicon controlled rectifiers. Load resistance and current are application conditions.

In most practical cases, the inverter load may not be assumed purely resistive. Thus, the extension of this case into the complex region is important.

The effects of additional shunt capacity in the load may be easily visualized from the previous analysis. This capacitance is in parallel with the commutating capacitance, and thus serves to increase it. If this load characteristic exists, it allows the designer to use less (or no) external capacitance for commutation.

A more difficult assumption is that of series inductance in the load. The effect of this condition may be seen by referring to FIGURE 2 or 3. During the turn off time, $t_0$, energy stored in the load inductance causes current to flow in a direction to charge the commutating capacitor in the reverse direction. Thus, "turn off time" is reduced. A simple solution to this problem is to use a larger commutating capacitor to compensate for the load inductance.

By combining equations the relationship $$\frac{CR^2}{2L} = i_0\left\{\left[\frac{1}{i_1} - i_1\right] + \left[i_0 - \frac{1}{i_0}\right]\right\} \quad (23)$$

is derived. Using a normalized current space $(i_0, i_1)$ the function above may be plotted. See waveforms of FIGURE 4.

It has now been found that if L is made non-linear in a way to vary as $R^2$, i.e., large inductance at low values of load current and small inductance at high current values, the function noted above becomes $$KC - i_0\left\{\left[\frac{1}{i_1} - i_1\right] + \left[i_0 - \frac{1}{i_0}\right]\right\} \quad (24)$$

where $$K = \frac{R}{2L}$$

A swinging choke substituted for the inductances of the circuit of FIGURE 1, the inductance may be made to vary with load changes. An advantage of using a non-linear choke is that $i_0$ and $i_1$ vary less with changing load resistance. Since $i_0$ and $i_1$ vary less, it follows from Equations 23 and 24 that less energy change is required in the commutating capcitor and inductors during load changes. This is shown in graph D of FIGURE 4.

In this way the inductor size is smaller consequently less in volume and cost. Starting the inverter under various load conditions is made easier due to reduced transients; less variation with load changes provides better utilization of the SCR's; less variation in source current allows better coordination of the protective system with the SCR's; also less variation in source current allows the use of an input filter of a smaller size and cost. The minimum change in energy stored in the commutating capacitor and commutating inductors due to load changes results in less utilization of the clamp system, thereby reducing system transients which may result in malfuctioning; and minimum change in energy stored in the commutating capacitor and commutating inductors due to load changes results in a smaller time delay in response, thereby reducing the possibility of a malfuction due to insufficient turn-off time.

What is claimed is:

1. A bridge inverter circuit comprising a first closed loop including a direct current source and an oscillator source; a second closed loop including a first pair of controlled switching elements and a second pair of controlled switching elements, a capacitor, and a load in parallel with said capacitor and cross connecting said second loop; a first inductance connected between said first loop and said second loop, a second inductance connected between said first loop and said second loop in opposite relationship to said first inductance; said inverter circuit satisfying the equation $$\frac{CR^2}{2L} = i_0\left\{\left[\frac{i}{i_1} - i_1\right] + \left[i_0 - \frac{l}{i_0}\right]\right\}$$

wherein C is capacitance, R the load, L the inductance, $i$ current, $i_0$ is the normalized peak current, $i_1$ normalized minimum current, and $l_1$ minimum current; and wherein said current $i_1$ and current $i_0$ is kept constant thereby permitting the inductance of said first and second inductance to vary with load changes.

2. A bridge inverter as set forth in claim 1 wherein said load is a resistive load.

3. A bridge inverter as set forth in claim 1 wherein said inductance varies as $R^2$.

4. A bridge inverter as set forth in claim 1 wherein said varying inductance provides large inductance at low values of load current and small inductance at high current values.

5. A bridge inverter as set forth in claim 1 wherein said function becomes $$KC = i_0\left\{\left[\frac{i}{i_1} - i_1\right] + i_1 - \frac{i}{i_0}\right\}$$

where $$K = \frac{R}{2L}$$

6. A bridge inverter as set forth claim 1 wherein said means for varying said inductance comprises a swinging choke.

References Cited

UNITED STATES PATENTS

| 2,972,710 | 2/1961 | D'Amico | 321—45 X |
| 3,074,030 | 1/1963 | Hierholzer | 321—45 X |
| 3,262,036 | 7/1966 | Clarke et al. | 321—5 X |
| 3,303,408 | 2/1967 | Prines | 321—45 |
| 3,309,600 | 3/1967 | Wellford | 321—45 |

JOHN F. COUCH, *Primary Examiner.*

W. M. SHOOP, *Assistant Examiner.*